United States Patent [19]

Ohta et al.

[11] Patent Number: 5,026,424
[45] Date of Patent: Jun. 25, 1991

[54] AQUATIC ANTIFOULING COMPOSITIONS

[75] Inventors: Motomi Ohta, Yokkaichi; Teruyoshi Takahashi, Kawaguchi; Hirotake Ikari, Chiba; Wataru Agui, Tokyo, all of Japan

[73] Assignee: Rohm and Haas Company, Philadelphia, Pa.

[21] Appl. No.: 399,661

[22] Filed: Aug. 28, 1989

[51] Int. Cl.$^5$ .................. C09D 5/14; C09D 5/16
[52] U.S. Cl. .................. 106/18.34; 106/18.35; 106/18.36; 106/15.05; 424/405
[58] Field of Search ............ 106/18.34, 15.05, 18.34, 106/18.35, 18.36; 424/405

[56] References Cited

U.S. PATENT DOCUMENTS

| | | | |
|---|---|---|---|
| 4,783,451 | 11/1988 | Haga et al. | 514/92 |
| 4,888,049 | 12/1989 | Iwasaki et al. | 71/94 |
| 4,889,863 | 12/1989 | Dolman et al. | 514/312 |
| 4,920,135 | 4/1990 | Wellinga et al. | 514/344 |

FOREIGN PATENT DOCUMENTS 49227 4/1976 Japan.
51517 5/1976 Japan.

OTHER PUBLICATIONS

CA 87(26): 206343u; Kamimoto, K., "Water Antifoulants"; JP 52-021331, Feb 17, 1977, Abstract.

Primary Examiner—William R. Dixon, Jr.
Assistant Examiner—Scott L. Hertzog
Attorney, Agent, or Firm—Michael B. Fein

[57] ABSTRACT

Compounds of formula I

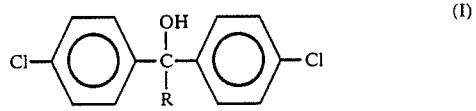

(wherein R represented ($C_1$–$C_4$)alkyl, cyclohexyl, trichloromethyl, ethoxycarbonyl, or isopropoxycarbonyl) optionally together with dithiocarbamate-type compounds, are effective aquatic antifouling agents.

13 Claims, No Drawings

AQUATIC ANTIFOULING COMPOSITIONS

This invention is concerned with aquatic antifouling compositions for preventing ships' bottoms, fishnets such as nursery nets and stationary nets, and other marine structures from being fouled or injured by aquatic organisms growing in attachment thereto.

Ships, specifically their submarine areas, draught-line zones, fishnets such as nursery nets and stationary nets, and other marine structures are prone to permanent attachment of aquatic organisms such as creatures including barnacles, hydroides, ascidians, sea mussels, and oysters, algae including sea lettuces, green lavers, and marine-spirogyra, and various bacteria, fungi, and diatoms collectively popularly referred to as "slime" and, therefore, are susceptible to very serious injuries inflicted by the organisms. Their owners incur great expense in having the structures freed from adherent organisms, repaired, and recoated. In the case of a ship, for example, a several percent increase in the resistance of its hull to movement through water, owing to the adhesion of such organisms, appreciably lowers its speed and fuel efficiency and causes serious economic loss.

In recent years, the advance of oceanographic development in coastal regions has encouraged construction and installation of large oceanic structures, structures annexed thereto, and other similar structures.

Structures for harbour facilities such as nautical beacons, floating beacons, mooring buoys, floating piers, floating breakwaters and floating docks, pipelines, bridges, tanks, water pipes in power stations, seaside industrial plants, mooring ships, restaurants and hotels, mooring and floating fishing structures, fish-preserving structures, and stationary nets and other structures for fishery facilities are exposed to sea water. When aquatic pollution-producing organisms adhere to such structures and grow, the lower members of such structures corrode and gain in weight and the structures consequently suffer from serious drawbacks such as sinking and loss of balance.

At facilities and plants, such as power stations, located along seashores and using sea water for cooling and other purposes and when such coastal structures as seawater inlets and outlets, channels, and culverts suffer aquatic polluting organisms adhering thereto and growing thereon, the volume occupied by the growing organisms at times occupies a significant proportion of the inner volume of such tubular structures, decreasing the available cross-sectional area of waterways, increasing resistance to flowing liquids, clogging screens inserted in the tubular structures for removal of suspended solids, and causing other problems.

Fishnets such as nursery nets and stationary nets and marine ropes are susceptible to adhesion of such aquatic organisms as barnacles, hydroides, ascidians, green lavers, and brown lavers. Since this impairs the economic use of such nets and ropes, their owners are compelled towards labour intensive maintenance thereof.

Hitherto, for combating these problems, sparingly soluble inorganic copper compounds, organic tin compounds, organic tin polymers and organic nitrogen and sulfur type compounds have been used as active antifouling agents.

These substances have various disadvantages, some being toxic to men and animals, others polluting the environment and yet others failing to be sufficiently efficaceous as aquatic antifouling agents in protracted use. For example, organic tin compounds are highly effective in curbing the unwanted adherence of aquatic organisms and, as such, have been extensively used as antifouling agents. In recent years, the undesirability of these organic tin type compounds associated with sparing decomposability, possible accumulation in living organisms, danger to men and animals and possible pollution of the environment has been drawing attention.

The toxicity of these organic tin type compounds has promoted the adoption of regulations for restricting and even prohibiting their use.

As active components for antifouling substances directed at aquatic organisms, such organic tin type compounds as tributyl tin hydroxide and triphenyl tin hydroxide have been highly regarded as the most effective in that they retain efficacy and stability of effect. Their lack of safety to men and animals and environmental pollution has aroused much anxiety and safe antifouling agents capable of taking their place have been actively sought.

We have not found that certain known miticides, alone or combined with dithiocarbamates, are useful aquatic antifoulants. In particular we have now surprisingly found that compounds of the general formula (I):

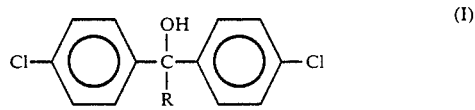

(wherein R represents $(C_1-C_4)$alkyl, cyclohexyl, tricholomethyl, ethoxycarbonyl or isopropoxycarbonyl) are effective antifouling compounds useful in compositions for application to surfaces for contact, especially submersion, with fresh or sea water but are safer and environmentally more attractive than many known antifoulants.

Antifouling compositions of this invention may be prepared by mixing or otherwise incorporating the active antifoulant compounds as above described with components such as a vehicle, organic solvent, and various additives in otherwise conventional marine or fresh water antifoulant formulations.

Among the compounds (I), those which contain the groups shown in Tale 1 as substituents (R) are preferred. These compounds have been known as active components chiefly for horticultural miticides. They have established their safety by passing all the stringent toxicological tests to which such compounds are subjected before such use.

TABLE 1

| Compound No. | R | Compound No. | R |
|---|---|---|---|
| 1 | $CH_3$ | 4 | $CCl_3$ |
| 2 | $C_2H_5$ | 5 | $COOC_2H_5$ |
| 3 | $C_6H_{11}$ | 6 | $COOCH(CH_3)_2$ |

This utility of these compounds as active components for antifouling agents aimed at aquatic organisms, however, has never been known in the art.

Dithiocarbamates, which are organic sulfur compounds are, like tin compounds, extensively used active components for antifouling agents. In Japanese Patent Application Disclosure SHO 51(1976)-49,227, for example, it is disclosed that protection of fishnets from adhesion of harmful organisms is accomplished by coating the fishnets with a composition produced by blending manganese ethylenebisdithiocarbamate as an antifouling component with a vehicle. In Japanese Patent Application Disclosure SHO 51(1976)-51,517, it is disclosed that the adhesion of such harmful organisms is prevented by coating the fishnets with an antifouling composition produced by combining a heavy metal salt of ethylenebisdithiocarbamic acid with a cellulose resin as a vehicle.

In terms of safety to men and animals and freedom from environmental pollution, metal salts of dithiocarbamic acid are rated as very desirable active antifouling agents. Nor infrequently, however, they fail to retain their effects for a very long time or manifest stable efficacy. To remedy this, heavy metal salts of alkylenebisdithiocarbamic acid have been used with an inorganic copper compound as an active e antifouling combination, possibly also incorporating another antifouling component, specifically an organic tin compound. This practice, however, is not fully satisfactory. We have not further surprisingly found that a combination antifouling agent comprising one or more compounds of Formula I together with one or more dithiocarbamate-type compound have particularly attractive properties combining effective aquatic antifouling properties with long effective life and capable of producing coatings sparingly susceptible to physicochemical deterioration, highly safe to men and animals and unlikely to cause environmental pollution.

Examples of the useful dithiocarbamate-type compounds are tetra-lower-alkyl thiuram sulfide compounds, heavy metal salts of lower-alkylenebisdithiocarbamic acids, metal-complexed heavy metal salts of lower-alkylenebisdithiocarbamic acids, heavy metal salts of monofunctional lower-alkyldithiocarbamic acids, heavy metal salts having lower-alkylenebisdithiocarbamic acids bonded to monofunctional lower-alkyldithiocarbamic acids through the medium of a heavy metal, and mixtures of the foregoing metal salts. To be more specific, mono- and di-sulfides of tetramethyl, tetraethyl, tetrapropyl, tetraisopropyl, and tetrabutyl thiurams can be used as a tetra-lower alkyl thiuram sulfide compound.

As examples of the heavy metal salts of a lower-alkylene-bisdithiocarbamic acid, divalent and higher heavy metal (zinc, manganese, copper, iron and nickel) salts of ethylenebisdithiocarbamic acid, linear or branched propylenebisdithiocarbamic acid, linear or branched butylenebisdithiocarbamic acid, N-substituted ethylenebisdithiocarbamic acid, N,N'-substituted ethylenebisdithiocarbamic acid, N-substituted propylenebisdithiocarbamic acid, N,N'-substituted propylenebisdithiocarbamic acid, N-substituted butylenebisdithiocarbamic acid, and N,N'-substituted butylenebisdithiocarbamic acid may be cited.

The heavy metal salts of metal-complexed lower-alkylenebisdithiocarbamic acids are those which are obtained by causing the aforementioned heavy metal salts of lower alkylenebisdithiocarbamic acids to be combined with other metal atoms coordinated therewith. They are represented by zinc-complexed manganese ethylenebisdithiocarbamate and copper-complexed ethylenebisdithiocarbamate, for example.

As examples of the heavy metal salt of the monofunctional lower alkyldithiocarbamic acid, divalent and higher heavy metal (zinc, manganese, copper, iron and nickel) salts of methyldithiocarbamic acid, dimethyldithiocarbamic acid, ethyldithiocarbamic acid, diethyldithiocarbamic acid, propyldithiocarbamic acid, dipropyldithiocarbamic acid, butyldithiocarbamic acid, and dibutyldithiocarbamic acid may be cited.

As examples of another species of dithiocarbamate-type compound useful in the invention, those metal salts which are formed by combining lower alkylenebisdithiocarbamic acid and monofunctional lower alkyldiethiocarbamic acids through the medium of a heavy metal may be mentioned. They are produced by preparing mixed aqueous solutions of water-soluble salts of lower alkylenebisdithiocarbamic acids and water-soluble salts of monofunctional lower alkyldiethiocarbamic acids and subjecting the mixed solutions to double decomposition with a water-soluble heavy metal salt. As examples of the lower alkylenebisdithiocarbamic acid moiety and the monofunctional lower alkyldiethiocarbamic acid moiety, those mentioned above may be cited. The salient representative of the species of dithiocarbamate type compounds described above is the mixed salt (bis-dimethyldithiocarbamoyl-dincethylenebisdithiocarbamate) having ethylenebisdithiocarbamic acid combined with dimethyldithiocarbamic acid through the medium of zinc. Generally, the product of this combination contains zinc dimethyldithiocarbamate, a heavy metal salt of a monofunctional lower alkyldithiocarbamic acid, and zinc ethylenebisdithiocarbamate, a heavy metal salt of a lower alkylenebisdithiocarbamic acid, as secondary products of the reaction involved. These products are generally referred to as "polycarbamate agents".

By "lower" alkyl and alkylene, we especially mean those containing 1 to 4 carbon atoms.

The dithiocarbamate-type compounds contemplated by the present invention can be used as effectively in the form of physically mixed metal salts as the chemically mixed metal salts described above. For use in the present invention, these compounds may be freely prepared to suit particular places and times of use.

The preferred antifouling compositions of the invention can be prepared by mixing at least one compound (I) and at least one dithiocarbamate-type compound as antifouling components with a vehicle, an organic solvent, and various additives.

In this invention, the antifouling component(s) can be incorporated freely in the antifouling composition. When the compound of formula (I) is used in the absence of dithiocarbamate, it is preferably used in an amount of 0.5 to 50% by weight, more preferably 0.5 to 30%, of the coating or impregnating compositions of the invention. When a dithiocarbamate is also used, preferably the compound (I) is used in an amount of 0.5 to 50% by weight, more preferably 0.5 to 20% by weight, and the dithiocarbamate compound in an amount of 0.5 to 30% by weight, more preferably 0.5 to 20% by weight, of the coating or impregnating composition.

The other components of the antifouling compositions of the invention can be any of those known for such use. For example, the antifouling compositions of this invention for actual use may be obtained by mixing the active compound in a vehicle, particularly a coating material or an organic solvent, with various additives. As the vehicle, animal fats, vegetable oils, natural oils and fats, acrylic resins, vinyl resins, epoxy resins, alkyd resins, petroleum resins, vinyl chloride, ethylenevinyl acetate copolymer, and rosin can be used.

As the solvent, one or more of the following are useful: xylene, solvent naptha, methylisobutyl ketone, methylethyl ketone and cellosolve, for example.

As the additives, those adjuvants suitably selected from among pigments such as iron oxide red and barium sulfate, brighteners such as talc, and plasticizers such as tricresyl phosphate can be suitably incorporated.

Optionally, the antifouling composition of the present invention may be used in combination with, or contain other active antifouling agent(s). The further antifouling agent can be expected to add to the effect of the antifouling composition.

The antifouling compositions are very efficaceous when applied to ships' hulls, fishnets such as nursery nets, stationary nets, and marine ropes, structures for harbour installations and combat fouling by a wide variety of harmful aquatic pests including animals such as barnacles, hydroides, ascidians, sea mussels, and mussels; algae such as sea lettuce, green lavers, lavers, marine-spirogyras; and various bacteria, fungi and diatoms collectively popularly referred to as "slime", over a usefully long period.

The compositions of the invention may be used in the same manner as conventional antifouling compositions. For use on a ship's hull or a marine structure, for example, the antifouling composition can be formulated in the same way as conventional marine coating materials and, as such, applied on the surface conventional manner, as a coating material. For example the antifouling agent(s) can be mixed with conventional ship's paints.

The use of the antifouling composition of this invention on a rope or fishnet may be accomplished by immersing the rope or fishnet in the antifouling composition, removing the impregnated fishnet, and drying the fishnet prior to use.

It has been long known that dithiocarbamate type compounds are highly effective in controlling bacteria and algae but are not fully effective in controlling such animals as barnacles, hydroides, sea mussels, and mussels. It is surprising that the combination antifouling compositions of the present invention are so effective in controlling these animals, bacteria and algae.

The invention will now be described more specifically with working examples and comparative experiments using the testing methods described.

TEST 1A (ANTIFOULING PROPERTY IN SEA)

Steel sheets measuring $300 \times 100 \times 1.5$ mm$^3$ and treated in advance by sand blasting were each coated three times with a commercially available vinyl tar type ship's bottom coating material, No. 1 and subsequently coated twice with the various antifouling compositions indicated in Table 2 (samples of Examples 1 to 9 and Comparative Experiments 1 and 2), dried indoors for four days, left suspended to a depth of 1.5 m from a raft floating in Katsuura Port of Wakayam Prefecture for 24 months, and kept under observation as to the adhesion of aquatic organisms. The results of this observation were evaluated by measuring the surface areas of adhesion (%) and rating the outcomes on the following scale. The results are shown in Table 3.

| Scale | Area of adhesion of alga |
|---|---|
| 0: | Absolute absence of adhesion |
| 1: | Adhesion in not less than 5% of area |
| 2: | Adhesion in not less than 10% of area |
| 3: | Adhesion in not less than 25% of area |
| 4: | Adhesion in not less than 50% of area |
| 5: | Adhesion not less than 50% |

TEST 1B (ANTIFOULING PROPERTY IN SEA)

Test 1A was repeated using the various antifouling compositions indicated in Table 4 (samples of Examples 10 to 20 and Comparative Experiments 3, 4 and 5), but in this case left submerged for 30 months, and kept under observation as to the adhesion of aquatic organisms. The results are shown in Table 5. Test 2 (Antifouling effect upon oceanic structure):

A steel sheet measuring $300 \times 100 \times 2$ mm$^3$ and treated in advance by sand blasting was coated with a zin epoxy type shop primer (dry film thickness 15 $\mu$) and an epoxy type antifouling coating material (200 $\mu$) to obtain a coated steel sheet. The various compositions indicated in Table 6 (Examples 21 to 31 and Comparative Experiments 6 to 9) was applied on the coated steel sheet in an amount calculated to produce a dry film of 100 $\mu$, to obtain a test sheet. The test sheet was dried at room temperature for seven days and left suspended at a depth of 1.5 m from a raft in Katsuura Harbour of Wakayama Prefecture and kept under observation with respect to the state of adhesion of organisms for 36 months. The evaluation was performed in the same manner as in Test 1. The results are shown in Table 7.

TEST 3A (ANTIFOULING EFFECT OF FISHNET)

In each of the solutions of Examples 32 to 37 and Comparative Experiments 10 and 11 as detailed in Table 8, a knotless net of polyethylene (five sections each of 70 cords 400 deniers) was left for impregnation and then dried and left immersed 1 m below sea in Omura Bay of Nagasaki Prefecture. The results were rated on the following scale. They are shown in Table 9.

| | Scale of rating: |
|---|---|
| A: | Absolute absence of adhesion of organisms |
| B: | Adhesion of organisms slight enough to permit continued use of net |
| C: | Adhesion of organisms so heavy as to permit no continued use of net |
| D: | Adhesion of organisms very heavy |

TEST 3B (ANTIFOULING EFFECT ON FISHNETS)

Test 3A was repeated using the compositions indicated in Table 10. The results are shown in Table 11.

The tests above and the Tables which follow clearly show that the compositions of this invention can solve the problem with which the invention is concerned by demonstrating aquatic antifouling effects as good as or better than conventional organic tin type compounds while being toxicologically and environmentally more desirable.

TABLE 2

| Component | \multicolumn{9}{c}{Parts by weight in EXAMPLE} | Comparative Expmnt | |
|---|---|---|---|---|---|---|---|---|---|---|---|
| | 1 | 2 | 3 | 4 | 5 | 6 | 7 | 8 | 9 | 1 | 2 |
| Compound 1 (Table 1) | 20 | 15 | | | | | | | | | |
| Compound 2 (Table 1) | | | 20 | | | | | | | | |
| Compound 3 (Table 1) | | | | 15 | | | | | | | |
| Compound 4 (Table 1) | | | | | 20 | 15 | | | | | |
| Compound 5 (Table 1) | | | | | | | 20 | 15 | | | |
| Compound 6 (Table 1) | | | | | | | | | 20 | | |
| Triphenyl tin fluoride | | | | | | | | | | 20 | 15 |
| Vinyl chloride-vinyl acetate copolymer | 6 | 6 | 6 | 6 | 6 | 6 | 6 | 6 | 6 | 6 | 6 |
| Rosin | 12 | 12 | 12 | 12 | 12 | 12 | 12 | 12 | 12 | 12 | 12 |
| Tricresyl phosphate | 2 | 2 | 2 | 2 | 2 | 2 | 2 | 2 | 2 | 2 | 2 |
| Iron oxide red | 10 | 10 | 10 | 10 | 10 | 10 | 10 | 10 | 10 | 10 | 10 |
| Talc | 10 | 13 | 10 | 13 | 10 | 13 | 10 | 13 | 10 | 10 | 13 |
| Barium sulfate | 10 | 12 | 10 | 12 | 10 | 12 | 10 | 12 | 10 | 10 | 12 |
| Methylisobutyl ketone | 15 | 15 | 15 | 15 | 15 | 15 | 15 | 15 | 15 | 15 | 15 |
| Xylene | 15 | 15 | 15 | 15 | 15 | 15 | 15 | 15 | 15 | 15 | 15 |

TABLE 3

| Number of months of standing | Evaluation by surface area of adhesion of organisms | | | |
|---|---|---|---|---|
| | 6 | 12 | 18 | 24 |
| Example 1 | 0 | 0 | 1 | 2 |
| Example 2 | 0 | 1 | 2 | 3 |
| Example 3 | 0 | 0 | 1 | 2 |
| Example 4 | 0 | 1 | 2 | 3 |
| Example 5 | 0 | 0 | 0 | 1 |
| Example 6 | 0 | 0 | 0 | 1 |
| Example 7 | 0 | 0 | 0 | 1 |
| Example 8 | 0 | 0 | 1 | 2 |
| Example 9 | 0 | 0 | 1 | 2 |
| Comparative Experiment 1 | 0 | 0 | 1 | 2 |
| Comparative Experiment 2 | 0 | 1 | 2 | 3 |
| Control | 5 | — | — | — |

TABLE 5

| Number of months of standing | Evaluation of adhesion of organism by surface area | | | | | |
|---|---|---|---|---|---|---|
| | 3 | 6 | 12 | 18 | 24 | 30 |
| Example 10 | 0 | 0 | 0 | 0 | 1 | 2 |
| Example 11 | 0 | 0 | 0 | 1 | 1 | 2 |
| Example 12 | 0 | 0 | 0 | 0 | 1 | 1 |
| Example 13 | 0 | 0 | 0 | 0 | 0 | 0 |
| Example 14 | 0 | 0 | 0 | 0 | 1 | 2 |
| Example 15 | 0 | 0 | 0 | 0 | 1 | 2 |
| Example 16 | 0 | 0 | 0 | 0 | 0 | 0 |
| Example 17 | 0 | 0 | 0 | 0 | 0 | 1 |
| Example 18 | 0 | 0 | 0 | 0 | 1 | 2 |
| Example 19 | 0 | 0 | 0 | 0 | 0 | 1 |
| Example 20 | 0 | 0 | 0 | 0 | 1 | 2 |
| Comparative Experiment 3 | 2 | 3 | 5 | 5 | 5 | 5[1] |
| Comparative Experiment 4 | 1 | 2 | 3 | 4 | 4 | 5[2] |
| Comparative | 0 | 0 | 0 | 1 | 2 | 3[3] |

TABLE 4

| Component | \multicolumn{11}{c}{Parts by Weight In Example} | \multicolumn{3}{c}{Comparative Experiment} | | |
|---|---|---|---|---|---|---|---|---|---|---|---|---|---|---|
| | 10 | 11 | 12 | 13 | 14 | 15 | 16 | 17 | 18 | 19 | 20 | 3 | 4 | 5 |
| Compound 1 (Table 1) | 10 | | | | | | | 10 | | | 3 | | | |
| Compound 2 (Table 1) | | 10 | | | | | | | 10 | | | | | |
| Compound 3 (Table 1) | | | 10 | | | | | | | | | | | |
| Compound 4 (Table 1) | | | | 10 | | | 10 | | | 5 | 3 | | | |
| Compound 5 (Table 1) | | | | | 10 | | | | | 5 | | | | |
| Compound 6 (Table 1) | | | | | | 10 | | | | | | | | |
| Tetramethyl thiuram disulfide | 5 | | | 5 | | | | | | | 3 | 20 | | |
| Tetraethyl thiuram disulfide | | 5 | | | | 2.5 | | | | | | | | |
| Tetramethyl thiuram monosulfide | | | 5 | | 2.5 | | | | | | | | | |
| Tetraethyl thiuram monosulfide | | | | | | 2.5 | | | | | | | | |
| Zinc ethylenebisdithiocarbamate | | | | | | | 5 | | | | | | | |
| Manganese ethylenebisdithiocarbamate | | | | | | | | 5 | | | | | 15 | |
| Zinc Complexed Manganese ethylenebisdithiocarbamate | | | | | | | | | 5 | | 3 | | | |
| Polycarbamate | | | | | 2.5 | | | | | 5 | 3 | | | |
| Tributyl tin methacrylate (50% xylene solution) | | | | | | | | | | | | | | 40 |
| Iron oxide red | 10 | 10 | 10 | 10 | 10 | 10 | 10 | 10 | 10 | 10 | 10 | 10 | 10 | 3 |
| Talc | 10 | 10 | 10 | 10 | 10 | 10 | 10 | 10 | 10 | 10 | 10 | 10 | 10 | |
| Barium sulfate | 10 | 10 | 10 | 10 | 10 | 10 | 10 | 10 | 10 | 10 | 10 | 10 | 10 | |
| Organic bentonite | | | | | | | | | | | | | | 1 |
| Acrylic resin (50% xylene Solution) | 30 | 30 | 30 | 30 | 30 | 30 | 30 | 30 | 30 | 30 | 30 | 30 | 30 | 16* |
| Copper suboxide | | | | | | | | | | | | | | 40 |
| Methylisobutyl ketone | 25 | 25 | 25 | 25 | 25 | 25 | 25 | 25 | 25 | 25 | 25 | 25 | 25 | |

*Xylene

TABLE 5-continued

| Number of months | Evaluation of adhesion of organism by surface area | | | | | |
|---|---|---|---|---|---|---|
| of standing | 3 | 6 | 12 | 18 | 24 | 30 |
| Experiment 5 Control | 5 | 5 | 5 | 5 | 5 | 5 |

Note:
[1 and 2] Heavy occurrence of adhesion of animals such as barnacles and ascidians;
[3] occurrence of adhesion of plants such as slime, green lavers, sea lettuces, and hydra.

TABLE 6

| Component | Parts by weight in Experiment | | | | | | | | | | | Comparative Experiment | | | |
|---|---|---|---|---|---|---|---|---|---|---|---|---|---|---|---|
| | 21 | 22 | 23 | 24 | 25 | 26 | 27 | 28 | 29 | 30 | 31 | 6 | 7 | 8 | 9 |
| Compound 1 (Table 1) | 12 | | | | | 5 | | 5 | | 3 | 3 | | | | |
| Compound 2 (Table 1) | | 12 | | | | | | 5 | | 3 | 3 | | | | |
| Compound 3 (Table 1) | | | 12 | | | | | | | | | | | | |
| Compound 4 (Table 1) | | | | 12 | | 5 | 10 | | 5 | 3 | 3 | | | | |
| Compound 5 (Table 1) | | | | | 6 | | | | | | 3 | | | | |
| Compound 6 (Table 1) | | | | | 6 | | | | 5 | | | | | | |
| Tetramethyl thiuram disulfide | 3 | | | | | | | | | | | 15 | | 5 | |
| Tetraethyl thiuram disulfide | | 3 | | | | | | | | | | | | | |
| Tetramethyl thiuram monosulfide | | | 3 | | | | | | | | | | | 5 | |
| Tetraethyl thiuram monosulfide | | | | 3 | | | | | | | | | | | |
| Zinc ethylenebisdithiocarbamate | | | | | 2.5 | | | | | | | | | 5 | |
| Manganese ethylenebisdithiocarbamate | | | | | | | | 5 | | 2 | | | 15 | | |
| Zinc Complexed Manganese ethylenebisdithiocarbamate | | | | | | | 2.5 | | 5 | | 1 | | | | |
| Polycarbamate | | | | | | 3 | 2.5 | 2.5 | | 2 | 2 | | | | |
| Tributyl tin methacrylate-copolymer (50% xylene solution) | | | | | | | | | | | | | | | 40 |
| Copper suboxide | | | | | | | | | | | | | | | 40 |
| Talc | 5 | 5 | 5 | 5 | 5 | 5 | 5 | 5 | 5 | 5 | 5 | 5 | 5 | 5 | |
| Zinc white | 5 | 5 | 5 | 5 | 5 | 5 | 5 | 5 | 5 | 5 | 5 | 5 | 5 | 5 | |
| Iron oxide red | 10 | 10 | 10 | 10 | 10 | 10 | 10 | 10 | 10 | 10 | 10 | 10 | 10 | 10 | 3 |
| Barium sulfate | 10 | 10 | 10 | 10 | 10 | 10 | 10 | 10 | 10 | 10 | 10 | 10 | 10 | 10 | |
| Vinyl chloride-vinyl acetate copolymer | 6 | 6 | 6 | 6 | 6 | 6 | 6 | 6 | 6 | 6 | 6 | 6 | 6 | 6 | |
| Resin | 12 | 12 | 12 | 12 | 12 | 12 | 12 | 12 | 12 | 12 | 12 | 12 | 12 | 12 | |
| Tricresyl phosphate | 2 | 2 | 2 | 2 | 2 | 2 | 2 | 2 | 2 | 2 | 2 | 2 | 2 | 2 | |
| Methylisobutyl ketone | 15 | 15 | 15 | 15 | 15 | 15 | 15 | 15 | 15 | 15 | 15 | 15 | 15 | 15 | |
| Xylene | 20 | 20 | 20 | 20 | 20 | 20 | 20 | 20 | 20 | 20 | 20 | 20 | 20 | 20 | 16 |
| Organic bentonite | | | | | | | | | | | | | | | 1 |

TABLE 7

| Number of months | Evaluation of adhesion of organism by surface area | | | | | | |
|---|---|---|---|---|---|---|---|
| of standing | 3 | 6 | 12 | 18 | 24 | 30 | 36 |
| Example 21 | 0 | 0 | 0 | 0 | 1 | 2 | 2 |
| Example 22 | 0 | 0 | 0 | 1 | 1 | 2 | 3 |
| Example 23 | | 0 | 0 | 0 | 1 | 1 | 2 |
| Example 24 | 0 | 0 | 0 | 0 | 0 | 0 | 0 |
| Example 25 | 0 | 0 | 0 | 0 | 1 | 2 | 2 |
| Example 26 | 0 | 0 | 0 | 0 | 0 | 2 | 2 |
| Example 27 | 0 | 0 | 0 | 0 | 0 | 0 | 1 |
| Example 28 | 0 | 0 | 0 | 0 | 1 | 1 | 2 |
| Example 29 | 0 | 0 | 0 | 0 | 0 | 1 | 2 |
| Example 30 | 0 | 0 | 0 | 0 | 0 | 1 | 2 |
| Example 31 | 0 | 0 | 0 | 0 | 0 | 1 | 2 |
| Comparative Experiment 6 | 1 | 2 | 4 | 5 | 5 | 5 | 5[1] |
| Comparative Experiment 7 | 0 | 1 | 2 | 3 | 4 | 5 | 5[2] |
| Comparative Experiment 8 | 0 | 1 | 2 | 4 | 4 | 5 | 5[3] |
| Comparative Experiment 9 | 0 | 0 | 0 | 1 | 2 | 3 | 3[4] |
| Control | 5 | 5 | 5 | 5 | 5 | 5 | 5 |

Note:
[1, 2 and 3] Heavy occurrence of adhesion of animals such as barnacles and ascidians;
[4] occurrence of adhesion of plants such as slime, green lavers, sea lettuces, and hydra.

TABLE 8

| Component | Parts by weight in Example | | | | | | Comparative Experiment | |
|---|---|---|---|---|---|---|---|---|
| | 32 | 33 | 34 | 35 | 36 | 37 | 10 | 11 |
| Compound 1 (Table 1) | 8 | | | | | | | |
| Compound 2 (Table 1) | | 12 | | | | | | |
| Compound 3 (Table 1) | | | 8 | | | | | |
| Compound 4 (Table 1) | | | | 12 | | | | |
| Compound 5 (Table 1) | | | | | 8 | | | |
| Compound 6 (Table 1) | | | | | | 12 | | |
| Triphenyl tin fluoride | | | | | | | 8 | 12 |
| Acryl resin (50% xylene solution) | 17 | | | 17 | | 15 | 15 | 15 |
| Ethylene-vinyl acetate copolymer resin | | | 10 | | 4 | | | |
| Chloride rubber | | | 4 | | | | | |
| Rosin | | | 8 | | 8 | | | |
| Xylene | 75 | 78 | | 71 | 80 | 73 | 77 | 73 |
| Solvent naphtha | | | 50 | | | | | |

TABLE 8-continued

| | Parts by weight in | | | | | | | |
|---|---|---|---|---|---|---|---|---|
| | Example | | | | | | Comparative Experiment | |
| Component | 32 | 33 | 34 | 35 | 36 | 37 | 10 | 11 |
| Methylethyl ketone | | | 30 | | | | | |

TABLE 9

| Number of months of standing | State of adhesion of aquatic organisms | | | | | |
|---|---|---|---|---|---|---|
| | 1 | 2 | 3 | 4 | 5 | 6 |
| Example 32 | A | A | A | B | B | C |
| Example 33 | A | A | A | B | B | C |
| Example 34 | A | A | A | B | B | C |
| Example 35 | A | A | A | A | B | B |
| Example 36 | A | A | A | A | B | C |
| Example 37 | A | A | A | A | B | C |
| Comparative Experiment 10 | A | A | A | B | B | C |
| Comparative Experiment 11 | A | A | A | A | B | C |
| Comparative Experiment 12 | C | D | — | — | — | — |

TABLE 10

| | Parts by weight in | | | | | | | | | | | | | Comparative Experiment | |
|---|---|---|---|---|---|---|---|---|---|---|---|---|---|---|---|
| | Example | | | | | | | | | | | | | | |
| Component | 38 | 39 | 40 | 41 | 42 | 43 | 44 | 45 | 46 | 47 | 48 | 49 | 50 | 12 | 13 | 14 |
| Compound 1 (Table 1) | 5 | | | | | | 2.5 | 2.5 | 5 | | 4 | | | | | |
| Compound 2 (Table 1) | | 5 | | | | | | | | | | | | | | |
| Compound 3 (Table 1) | | | 7 | | | | | | | | | | | | | |
| Compound 4 (Table 1) | | | | 4 | | | 2.5 | | | 5 | 4 | 5 | 3 | | | |
| Compound 5 (Table 1) | | | | | 5 | | | 2.5 | | | | | 3 | | | |
| Compound 6 (Table 1) | | | | | | 5 | | | | | | | | | | |
| Tetramethyl thiuram disulfide | 5 | | 3 | | | | 3 | 3 | | | | 2 | 10 | | | |
| Tetraethyl thiuram disulfide | | 3 | | 4 | | | | | | | | | | | | |
| Tetramethyl thiuram monosulfide | | | | | 5 | | | 3 | | | | | | | | |
| Tetraethyl thiuram monosulfide | | | | | | 5 | | | | | | | | | | |
| Zinc ethylenebisdithiocarbamate | | | | | | | | | 5 | | | | | | | |
| Manganese ethylenebisdithiocarbamate | | | | | | | | | | 5 | | | | | 10 | |
| Zinc-coordinated manganese ethylenebisdithiocarbamate | | | | | | | | | | | 2 | | | | | |
| Polycarbamate | | | | | | | | | | | | 5 | 2 | | | |
| Triphenyl tin hydroxide | | | | | | | | | | | | | | | | 8 |
| Acryl resin (50% xylene solution) | 10 | | | 10 | | 10 | 10 | | 10 | | 12 | 15 | | 15 | 15 | 2 |
| Ethylene-vinyl acetate copolymer resin | | 10 | | | 5 | | | | | 12 | | | 4 | | | |
| Chloride rubber | | | 2 | | | | | 8 | | | | | | | | |
| Rosin | | | | | 6 | | | 10 | | | | 6 | | | | |
| Xylene | 80 | 82 | | 82 | 79 | 80 | 82 | | 80 | 78 | 78 | 75 | 80 | 75 | 75 | 70 |
| Solvent naphtha | | | 52 | | | | | 41 | | | | | | | | |
| Methylethyl ketone | | | 30 | | | | | 30 | | | | | | | | |

TABLE 11

| Number of months of standing | Evaluation of adhesion of organism by surface area | | | | | |
|---|---|---|---|---|---|---|
| | 1 | 2 | 3 | 4 | 5 | 6 |
| Example 38 | A | A | A | A | A | B |
| Example 39 | A | A | A | A | A | B |
| Example 40 | A | A | A | A | A | B |
| Example 41 | A | A | A | A | A | A |
| Example 42 | A | A | A | A | A | B |
| Example 43 | A | A | A | A | A | B |
| Example 44 | A | A | A | A | A | B |
| Example 45 | A | A | A | A | A | B |
| Example 46 | A | A | A | A | A | B |
| Example 47 | A | A | A | A | A | A |
| Example 48 | A | A | A | A | A | A |
| Example 49 | A | A | A | A | A | A |
| Example 50 | A | A | A | A | A | B |
| Comparative Experiment 12 | C | D[1] | — | — | — | — |
| Comparative Experiment 13 | B | C | D[2] | — | — | — |
| Comparative Experiment 14 | A | A | A | B | B | C[3] |
| Control | C | D | — | — | — | — |

Note:
[1] and [2] Heavy occurrence of adhesion of animals such as barnacles and ascidians;
[3] occurrence of adhesion of plants such as slime, green lavers, sea lettuces, and hydra.

We claim:

1. An aquatic antifouling composition consisting essentially of a vehicle and/or solvent and sufficient compound of the formula

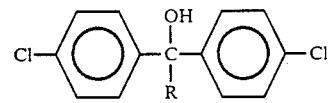 (I)

wherein R represents $(C_1-C_4)$alkyl, cyclohexyl, trichloromethyl, ethoxycarbonyl, or isopropoxycarbonyl to prevent adhesion of aquatic organisms to articles on which said composition is applied, said composition optionally containing an amount of at least one dithiocarbamate compound sufficient to enhance the antifouling effect of said composition.

2. Composition of claim 1, including sufficient amount of at least one dithiocarbamate compound to enhance the antifouling effect of said composition.

3. A composition as claimed in claim 1, suitable for coating or impregnating a fishnet or rope, in which said sufficient amount of the compound of formula (I) is about 0.5 to 50% by weight.

4. A composition as claimed in claim 2 suitable for coating or impregnating a structure to be immersed in sea water consisting essentially of about 0.5 to 50% of at least one compound of formula I and about 0.5 to 30% of at least one of said dithiocarbamate compound.

5. A composition as claimed in claim 1 suitable for coating the surface of a ship comprising a vehicle, solvent, and additives, and about 0.5 to 50% by weight of at least one compound of formula I.

6. A method to prevent the adhesion of aquatic organisms to articles, said method comprising coating or impregnating said article with a composition according to claim 1.

7. The method as claimed in claim 6 wherein at least one dithiocarbamate-type compound is applied to said article in an amount effective to impart enhanced antifouling effect.

8. An article coated or impregnated by an antifouling composition as defined in claim 1.

9. A composition as claimed in claim 1 wherein R is selected from the group consisting of methyl, ethyl, hexyl, trichloromethyl, $-COOC_2H_5$ or $-COOCH(CH_3)_2$.

10. A composition according to claim 2 wherein said dithiocarbamate-type compound is selected from the group consisting of a tetra-lower-alkyl-thiuram monosulfide, a tetra-lower-alkyl disulfide, a heavy metal salt of a lower alkylenebisdithiocarbamic acid, a heavy metal salt of a metal-complexed lower alkylenebisdithiocarbamic acid, a heavy metal salt of a monofunctional lower alkyldithiocarbamin acid, a heavy metal salt having a lower alkylenebisdithiocarbamic acid and a monfunctional lower alkyldithiocarbamic acid coupled to each other through the medium of a heavy metal atom, and mixtures thereof.

11. Article according to claim 8 in the form of a marine structure.

12. Article according to claim 8 in the form of a ship.

13. Article according to claim 8 in the form of a fish net which has been impregnated by said composition.

* * * * *